(12) United States Patent
Stewart

(10) Patent No.: X8275
(45) Date of Patent: Jun. 19, 1834

(54) COOKING STOVE

(76) Inventor: Philo P. Stewart

Philo P. Stewart, of Elyria, Ohio
Letters Patent

The schedule refered to in these Letters Patent and making part of the same containing a description in the words of the said Philo P. Stewart himself of his improvement in the Cooking Stove

---

To all to whom these presents shall come: Be it known that I, Philo P. Stewart of Elyria, in the County of Lorain and State of Ohio, have invented a new and useful improvement in a Cooking Stove and that the following is a full and exact description of the construction of the said Stove as improved by me. This stove, denominated "The Oberlin Cooking Stove" comprises the following properties or things viz: a fire chest, a grate, an ash pit, a hearth, with an indenture; five appertures for boilers &c. a warming arch, an oven, two flues & a funnel. — The bottom plate of said Stove which is supported by feet or otherwise constitutes the hearth of the ash pit and also of the warming arch. The ash pit is an oblong box resting on the front side of the "bottom plate" first mentioned said ash pit is separated from the fire chest by a grate and has an opening at one end for the purpose of removing the ashes and of admitting air through the grate into the fire chest. —
The fire chest is also oblong, is wider than the ash pit, but contracted on the sides towards the bottom, so as to be of the same width as the ash pit.
The front of the fire chest is a hearth with an indenture for broiling &c. extending forward on a horizontal line with the grate. On the top of the fire chest are two apertures for boiling &c. a larger apperture is constituted by removing a central section of the top plate of the fire chest and partially closing the two aforesaid smaller appertures by sections of covers in form of a crescent. The said larger apperture extends quite from the front of the fire chest to a line perpendicular with the front plate of the oven. The said apperture causes a curved indenture in that plate which connects the top plate of the fire chest with the top most plate of the back part of the stove. —
The said connecting plate is on an angle with the top plate of the fire chest of about 110 degrees. The fire chest has two doors in front and one at the end - The warming arch is an open space constituted by an elevation of the oven to the height of about 10 inches above the bottom plate having the ash pit and a part of the fire chest in front and merely two standards or pillars in rear - The oven is above the warming arch and in rear of the fire chest. - The bottom of the oven is elevated to about 1/3 the height of the fire chest. The front side of the oven rises perpendicularly about one third the heighth of the same. The oven top is curved towards the front so as to meet the aforesaid plate on the front side - The oven top rises perpendicularly to the top. the oven has a door at each end - In the top plate on the back part of the stove and over the oven are two appertures for frying &c. A moveable damper is placed on the front part of the oven, shorter than the oven giving opportunity for the heat intercepted by the damper to pass into the open oven near the oven doors - The flues which pass, the one under, and the other over the oven meet on the top at the backside where is situated the funnel for conducting off the smoke - - Those parts of the Oberlin Cooking Stove not belonging to and which are claimed to be an improvement on other cooking stoves are the following towit: 1st The construction of the lower part of the fire chest, the advantages of this contraction are, when several pieces of fuel are burning they are kept more compact, consequently combustion goes on more effectively and requires less attention. 2nd The warming arch. The advantages of this are manifold, and will readily suggest themselves to the careful house keeper - -
3d The curved indenture in the plate which connects the top plate of the fire chest with the topmost plate of the back part of the stove. The advantages of this indenture are, the apperture occupying the central portion of the fire chest may be larger in a stove of given dimensions than it could be if the said indenture were not there and also the indenture causes the flame which passes over the oven to extend nearer each end of the oven than it would otherwise do. 4th The moveable plate or damper in the front part of the oven. The advantage of this is. The damper does not prevent any heat from coming into the oven but modifies where it would otherwise be too great, and increases it where it might be too slight. 5th The covers are mounted in a new and improved manner - handles of wrought iron are attached to the covers near the edge leaving the central part of the cover smooth and in proper condition to receive any articles that are proper to be placed upon them in -

Witnesses

H. D. Hatch

Levi Burnell

Philo P. Stewart

Bud.

975 wds